Sept. 23, 1924.
G. MERSEREAU
1,509,603
PROCESS AND APPARATUS FOR TREATING GASES
Original Filed Sept. 16, 1913
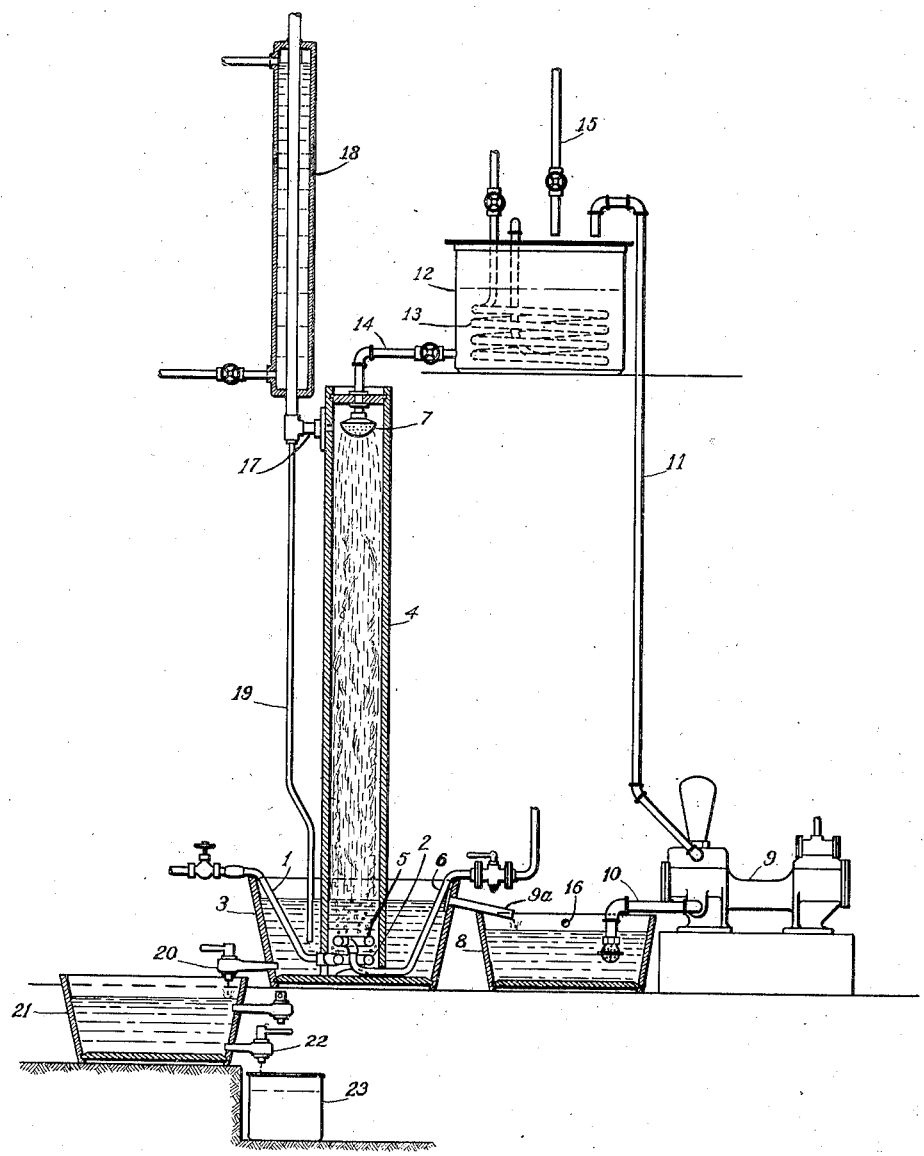
WITNESSES:
E. A. Rennie
Arthur A. Johnson
INVENTOR
Gail Mersereau
BY Edward Thomas
ATTORNEY Patented Sept. 23, 1924.

1,509,603

UNITED STATES PATENT OFFICE.

GAIL MERSEREAU, OF NEW YORK, N. Y., ASSIGNOR, BY MESNE ASSIGNMENTS, TO CARBIDE AND CARBON CHEMICALS CORPORATION, A CORPORATION OF NEW YORK.

PROCESS AND APPARATUS FOR TREATING GASES.

Application filed September 16, 1913, Serial No. 790,080½. Renewed August 15, 1918. Serial No. 250,074.

*To all whom it may concern:*

Be it known that I, GAIL MERSEREAU, a citizen of the United States, and resident of New York, in the county of New York and State of New York, have invented a certain new and useful Improved Process and Apparatus for Treating Gases, of which the following is a specification.

My invention relates to process and apparatus for treating gases.

In many reactions, such for example as treating olefins and diolefins with chlorin to produce addition products, it is extremely desirable to accurately control the temperature at which the reaction takes place. To obtain such control it is often insufficient to merely maintain the walls of the container at a given temperature, for the reactions may proceed at such a rapid rate that the radiation from the walls and the convection currents have but a slight effect at the center of the receptacle. It therefore becomes desirable to have the reactions take place in the intimate presence of a substance of high specific heat. It is desirable sometimes too, to have a solvent or a catalytic agent distributed through the space where the reaction is going on.

I have found that such desirable effects may be obtained by having the reactions take place in the presence of a shower or rain of suitable liquid cooled or warmed to the desired temperature. The choice of such a liquid will depend on the reaction which it is desired to control. I have found that where it is desired to chlorinate the above-described olefins and diolefins with gaseous chlorin, a shower of water or of the liquid chlorinated products themselves will prove a satisfactory cooling or heating agent for controlling the reaction. In the accompanying drawing, which shows a section through an apparatus for carrying out my process, gases consisting of or comprising mixed olefins and diolefins and acetylenes and other gases, many of them saturated, such as may be obtained by the heating or pyrolyzing of many petroleum products under proper conditions, are led from a suitable apparatus through a valved pipe 1, so that they bubble up from a perforated ring 2, through a pool of water in closed tower 4 or in a tub or tank 3, in which is submerged the base of a closed chamber or tower 4.

This tower I have found will last fairly well if made even of pine boards, but it may be made of terra cotta or metal lined with plastic material, or of steel, copper, lead, etc., or other metal alone, or of other suitable material.

The gases, as they bubble up through the pool of water, catch and unite with a gaseous halogen such as chlorin which is bubbling from a perforated ring 5 at the end of a pipe 6, which also projects into the pool of water and lies above the ring 2. This brings the unsaturated gases between the chlorin and the pump described below. The chlorin is heavier than much of the gas that enters, and probably dissolves at least slightly in the water. The chlorin and other gases rise from the surface of the pool and combine in the pool and in the space above the pool.

Through this space within the tower 4 falls a rain or continuous shower of water from wire gauze or a foraminous plate 7, at the top of the tower. The plate may be furnished with holes of the size and shape formed by driving an ordinary 6$^d$ wire nail through tin; such holes at ¾ inch intervals from a satisfactory shower. This rain of water keeps the temperature uniform throughout the tower above the pool. The incoming water may overflow from the pool into a second tank or pool 8 through a pipe 9$^a$ in the side of the tank 3 and be drawn from said second tank 8 by a pump 9 through a pipe 10. This pump may be made of earthenware or other suitable material, or may include an acid egg. I have, however, found that an ordinary iron and steel piston pump will stand considerable service without showing signs of corrosion where the gas combining with the chlorin is maintained in sufficient quantity. The water drawn from the pool is forced up through a pipe 11, to a tank 12, which may contain a heating or cooling coil 13. The water is fed from the upper tank 12, to the shower plate 7 through a valved pipe 14. The tank 12 may include a valved supply 15 from a water main, and the tank 8 may be furnished with an overflow 16, to carry off any surplus.

The tower 4 may include an outlet pipe 17 at one side near the top with which is connected a reflux condenser 18, having a pipe 19 to lead any condensed liquid back beneath the surface of the pool in the tub 3.

As the stated gases and chlorin unite in the pool and in the tower above the pool, they form a heavy liquid. This is useful as a solvent and though volatile is heavier than water, so that when it condenses the water floats on its surface and seals the heavy liquid against evaporation. The heavy liquid may be drawn off from the tub 3 by a faucet 20, near its bottom and run into an open storage tank 21, where it is kept under a water seal. From this tank 21 the liquid may be drawn off as wanted by a faucet 22 into a receptacle 23 for shipment or treatment.

Apparently the olefins and diolefins have such an avidity for chlorin that they abstract it so rapidly from the water as to prevent any notable amount of other chlorin compounds from being formed.

While I have described the apparatus as being used with water for the cooling agent, it will be apparent that the apparatus is equally adapted to be used with the heavy liquid itself as a cooling, diluting or solvent agent, and the results may be the same, since water is a solvent of chlorin, but apparently not to any extent a solvent of the gases used in the above process as described in detail, while the above-described heavy liquid apparently dissolves chlorin and the gases to about the same extent.

Where nearly pure chlorin is used and water is employed to control the temperature, the most desirable temperature for the particular process herein described seems to be about 15° C. At this temperature practically all of the unsaturated gases seem to be quickly and completely saturated with chlorin by simple addition reactions, while almost no substitution products seem to be formed. This may be partly due to having the reactions take place in a perfectly dark tower. If chlorin from the Deacon process is used containing a very large admixture of air, it seems better to maintain the temperature in the tower at about 50° C. In this case the air introduced with the chlorin apparently acts as a diluting agent, and perhaps the water acts as a catalyzing agent. Apparently the presence of ordinary types of catalyzing agents is unnecessary, and possibly may be harmful.

It will be noted that the unsaturated gases and chlorin are introduced at the bottom of the tower 3 and rise upward through a rain, not only of water but also of any heavy liquid which may have been formed. These get thoroughly mixed as the drops rain into the pool and thus complete any reactions.

The fixed gases issuing as waste from the outlet pipe 17 form a suitable gas for fuel or other purposes. Substitution products can be made from such gases by treating them with chlorin in the presence of light as a mercury vapor lamp. For convenience I have called the above-described process the "shower bath" process of treating gases. The product can be fractioned or otherwise separated for further treatment.

I believe that the product which I have obtained by pyrolizing oils contains 4 and 5 and 6 carbon atom unsaturated compounds having one or more double bonds. My present shower bath process furnishes an admirable means for adding chlorin to such compounds and controlling any rearrangement of the double bonds or other groups of atoms.

This bath will be found of practical use in the manufacture of chlorin or bromin derivatives or addition products from unsaturated carbon compounds as a step in the manufacture of artificial rubber.

For example, chlorin can be added to trimethylethylene. The product of this can be heated with a catalytic such as barium chloride to form diolefins, of which isoprene will be one product.

Among other products of my shower bath process a hydrochloride of ethylene chloride seems to be formed, probably having the formula $$(CH_2Cl—CH_2Cl)HCl$$

When this is treated with lime or other alkali in excess, the hydrochloric acid breaks off, giving apparently a nearly pure ethylene chloride of definite boiling point 82° C.

I have also found that among the products obtained by treating pyrolyzed oils with chlorin in my shower bath process are tetrachlor ethane ("acetylene tetrachlorid") and tetrachlor propane which are useful both in themselves and as starting points for other products. When these are treated with alkalies, such as lime in excess, one hydrochloric acid splits off forming trichlor products of which $CCl_2=CHCl$ is the type.

Still another product which usually is formed in very small amounts is a waxy product, hexachlor ethane,  which is non-inflammable and has its melting and boiling points near 200° C.

This wax is fireproof and can be refined by recrystallization from solvents. The above-mentioned low boiling point product or even ordinary kerosene oil is a suitable solvent for this purpose.

I have also found that the fraction boiling at over 125° C. of the heavy liquid, as carried out with pyrolized petroleum and chlorin, forms an excellent substitute for spirits of turpentine. For instance, such fractions can be used in place of turpentine in varnishes. Such varnishes will be non-inflammable.

This same fraction will also serve as a paint remover, or the base of one.

It seems inadvisable to carry distillation in fractionation at a temperature much above 150° C., as decomposition seems to begin not far from that temperature with the production of products having offensive odors.

My crude heavy liquid as well as its fractions form an excellent solvent for the dyes insoluble in water which are sometimes used in silk and other dyeing. Such dyes as for example patent blue and rhodamine B will dye silk so that it will not spot with water, if such dyes are used when dissolved in my crude heavy liquid.

While I have described in great detail certain features of my invention, it will be understood that I have done so to enable those skilled in the art to appreciate some of its advantages, and what I claim as my invention is:

1. The process which comprises bubbling a complex mixture of saturated and unsaturated hydrocarbon gases beneath the surface of a temperature controlling liquid, simultaneously but separately bubbling beneath said surface a halogen with which said unsaturated gas will react to form a new product, allowing the volatile parts to rise through a rain of said liquid, and collecting the product separately from the unacted on gases.

2. The process of obtaining a chlorine containing product which comprises passing a mixture of gases including saturated and unsaturated hydrocarbon compounds, and chlorine into a space through which a temperature controlling liquid is raining, and removing the chlorine containing product separate from the other substances present.

3. The process of obtaining a product which comprises passing unsaturated gases and a halogen into a space through which a shower of temperature-controlling liquid is raining, and removing the product.

4. The process of obtaining a product which comprises passing unsaturated carbon gaseous compounds and a halogen into a dark space through which a shower of temperature-controlling liquid is raining, and removing the product.

5. The process of obtaining a product which comprises pyrolizing oils to produce complex mixtures of unsaturated and saturated carbon gaseous compounds, then passing such gases, together with a halogen into a dark space through which a shower of temperature-controlling water is raining to produce a new product, and removing said product separately from the unacted on gases.

6. The process which comprises bringing together chlorine and unsaturated hydrocarbon gases by bubbling them through a temperature controlling liquid simultaneously and separately but near each other, and letting such gases as do not combine beneath the surface rise from the surface through a rain of such temperature controlling liquid.

7. The process which comprises pyrolizing oils to produce a complex mixture of unsaturated and saturated gaseous carbon compounds, bringing said mixed gases into the presence of a halogen beneath the surface of a temperature-controlling liquid allowing the volatile parts to rise through a rain of said liquid, so that they there combine to form a new product, and collecting the product separately from the unacted on gases.

8. The process which comprises pyrolizing oils to produce a complex mixture of unsaturated and saturated gaseous carbon compounds, bringing said mixed gases into the presence of a gas with which the unsaturated gases will react to combine in the presence of a rain of temperature-controlling liquid to form a new product, and collecting the product of such reaction separately from the unacted on gases.

9. The process of obtaining a product which comprises pyrolizing oils to form a complex mixture of saturated and unsaturated gaseous carbon compounds, passing said gases and chlorine into a pool of temperature-controlling liquid, so that the unacted on gases rise through a rain of temperature-controlling liquid to obtain a new product, and recovering the product separately from the unacted on gases.

10. The process of separating saturated from unsaturated gaseous carbon compounds in a mixture of gases which comprises passing the mixture into the presence of chlorin in a rain of water, and permitting any saturated gases to pass off while the unsaturated gases take up chlorin and fall as a liquid.

11. The combination with a substantially dark chamber of a pool of temperature-controlling liquid at the bottom thereof, means for admitting a gas to said chamber beneath the surface of said pool, means for admitting a second gas beneath the surface of said pool, an escape duct for uncombined gases above said pool and means for showering said liquid through the space above said pool.

12. The combination with a chamber, of a pool of temperature-controlling liquid at the bottom thereof, means for removing liquids from said pool, means for admitting a corrosive gas beneath the surface of said pool, means for admitting a non-corrosive gas beneath the surface of said pool between the corrosive gas and the removing means, an escape duct for uncombined gases above said pool, and means for showering said liquid through the space above said pool.

13. The process of making a chlorine containing compound which comprises bringing together unsaturated hydrocarbon gas and chlorine in the presence of sufficient water in a finely divided state to control the temperature and removing the product separated from any unacted on gas.

14. The process of making a complex mixture of chlorine containing carbon compounds which comprises bringing together complex mixed unsaturated and saturated hydrocarbon gases and chlorine in the presence of water in a finely divided state, and removing the unacted on gases separate from the chlorine containing product.

15. The process of making chlorine containing carbon compounds which comprises bringing a complex mixture of gases comprising saturated and unsaturated hydrocarbons together with chlorine in the presence of sufficient water in a finely divided state to control the temperature, and removing the products separately from any unacted on gas.

16. The process which comprises bringing together unsaturated gaseous carbon compounds of the ethylene series and chlorine in the presence of the product formed by their combination.

GAIL MERSEREAU.

Witnesses:
TITUS H. IRONS,
F. E. ALEXANDER.